(12) United States Patent
Rydnell et al.

(10) Patent No.: US 7,916,732 B2
(45) Date of Patent: Mar. 29, 2011

(54) METHOD AND SYSTEM FOR IMPLEMENTATION OF SBLP FOR A WLAN-GSM/3G INTEGRATED SYSTEM

(75) Inventors: Gunnar Rydnell, V Frolunda (SE); Hans Bertil Rönneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 820 days.

(21) Appl. No.: 11/720,496

(22) PCT Filed: Dec. 3, 2004

(86) PCT No.: PCT/SE2004/001787
§ 371 (c)(1),
(2), (4) Date: May 30, 2007

(87) PCT Pub. No.: WO2006/059931
PCT Pub. Date: Jun. 8, 2006

(65) Prior Publication Data
US 2008/0181147 A1    Jul. 31, 2008

(51) Int. Cl.
*H04L 12/28* (2006.01)
(52) U.S. Cl. .............. 370/395.21; 370/230; 370/235; 370/310; 370/395.42; 370/395.43
(58) Field of Classification Search .............. 370/230, 370/235, 310, 395.42, 395.43, 395.21
See application file for complete search history.

(56) References Cited

U.S. PATENT DOCUMENTS

| | | | |
|---|---|---|---|
| 6,487,595 B1 * | 11/2002 | Turunen et al. | 709/226 |
| 6,621,793 B2 * | 9/2003 | Widegren et al. | 370/230.1 |
| 2002/0062376 A1 * | 5/2002 | Isoyama | 709/226 |
| 2002/0078236 A1 * | 6/2002 | Mar et al. | 709/238 |
| 2004/0198365 A1 | 10/2004 | Verma et al. | |
| 2004/0223602 A1 * | 11/2004 | Honkasalo et al. | 379/243 |

FOREIGN PATENT DOCUMENTS

WO   WO 03/105007 A1   12/2003

(Continued)

OTHER PUBLICATIONS

3GPP TS 23.234 V2.3.0 (Nov. 2003), 3rd Generation Partnership Project, Technical Specification Group Services and System Aspect, 3GPP System to WLAN interworking System Description (Rel. 6).*

(Continued)

*Primary Examiner* — Jinsong Hu
*Assistant Examiner* — Dung Hong

(57) ABSTRACT

Packet data gateway (PDG) in an integrated WLAN-GSM/3G core network, is disclosed comprising a router (R) having a number of gateways (Wi; OP INT 1, OP INT 2, INT DEFAULT) which are associated with various QoS traffic properties (BE, EF), an interface to a WLAN network (Wu) and an interface (Go) to a policy decision function (PDF), a translating unit (TLT). The packet data gateway engages in a service based local procedure (SBLP) whereby a negotiated QoS property is received for a given session identifier as negotiated between a user entity (UE), an Application Function (AF) and a Policy Decision Function (PDF). A WLAN user entity engaging with the PDG is defined. Moreover, a service based local policy procedure (SBLP) for a packet data gateway (PDG) and Service based local policy procedure for a dedicated gateway support node (GGSN) and a tunnel terminal gateway (TTG) is disclosed.

10 Claims, 9 Drawing Sheets

FOREIGN PATENT DOCUMENTS

WO WO 2004100431 A2 11/2004

OTHER PUBLICATIONS

3GPP TS 23.228 V8.0.0 (Mar. 2007) 3rd Generation Partnership Project; Technical Specification Group Services and System Aspects; IP Multimedia Subsystem (IMS); Stage 2 (Release 8).

3GPP TS 23.002 V7.1.0 (Mar. 2006) 3rd Generation Partnership Project; Technical Specification Group Services and Systems Aspects; Network architecture (Release 7).

3GPP TS 29.208 V6.6.1 (Mar. 2006) 3$^{rd}$ Generation Partnership Project; Technical Specification Group Core Network and Terminals; End-to-end Quality of Service (QoS) signalling flows (Release 6).

3GPP TS 23.234 V7.5.0 (Mar. 2007) 3rd Generation Partnership Project; Technical Specification Group Services and System Aspects; 3GPP system to Wireless Local Area Network (WLAN) interworking; System description (Release 7).

3GPP TS 23.207 V6.4.0 (Sep. 2004) 3rd Generation Partnership Project; Technical Specification Group Services and System Aspects; End-to-end Quality of Service (QoS) concept and architecture (Release 6).

Blake et al. Architecture for Differentiated Services. RFC 2475. Dec. 1998.

3GPP TS 23.234 v6.1.0 3GPP System to Wireless Local Atra Network (WLAN) interworking see section 6.2.6.

"CR on IMS over WLAN", S2-042509, Change request, Samsung, Aug. 2004 see pp. 4-5.

3GPP TS 23.228 V8.0.0 (Mar. 2007) 3rd Generation Partnership Project; Technical Specification Group Services and System Aspects; IP Multimedia Subsystem (IMS); Stage 2 (Release 8).

3GPP TS 23.002 V7.1.0 (Mar. 2006) 3rd Generation Partnership Project; Technical Specification Group Services and Systems Aspects; Network architecture (Release 7).

3GPP TS 29.208 V6.6.1 (Mar. 2006) 3$^{rd}$ Generation Partnership Project; Technical Specification Group Core Network and Terminals; End-to-end Quality of Service (QoS) signalling flows (Release 6).

3GPP TS 23.234 V7.5.0 (Mar. 2007) 3rd Generation Partnership Project; Technical Specification Group Services and System Aspects; 3GPP system to Wireless Local Area Network (WLAN) interworking; System description (Release 7).

\* cited by examiner

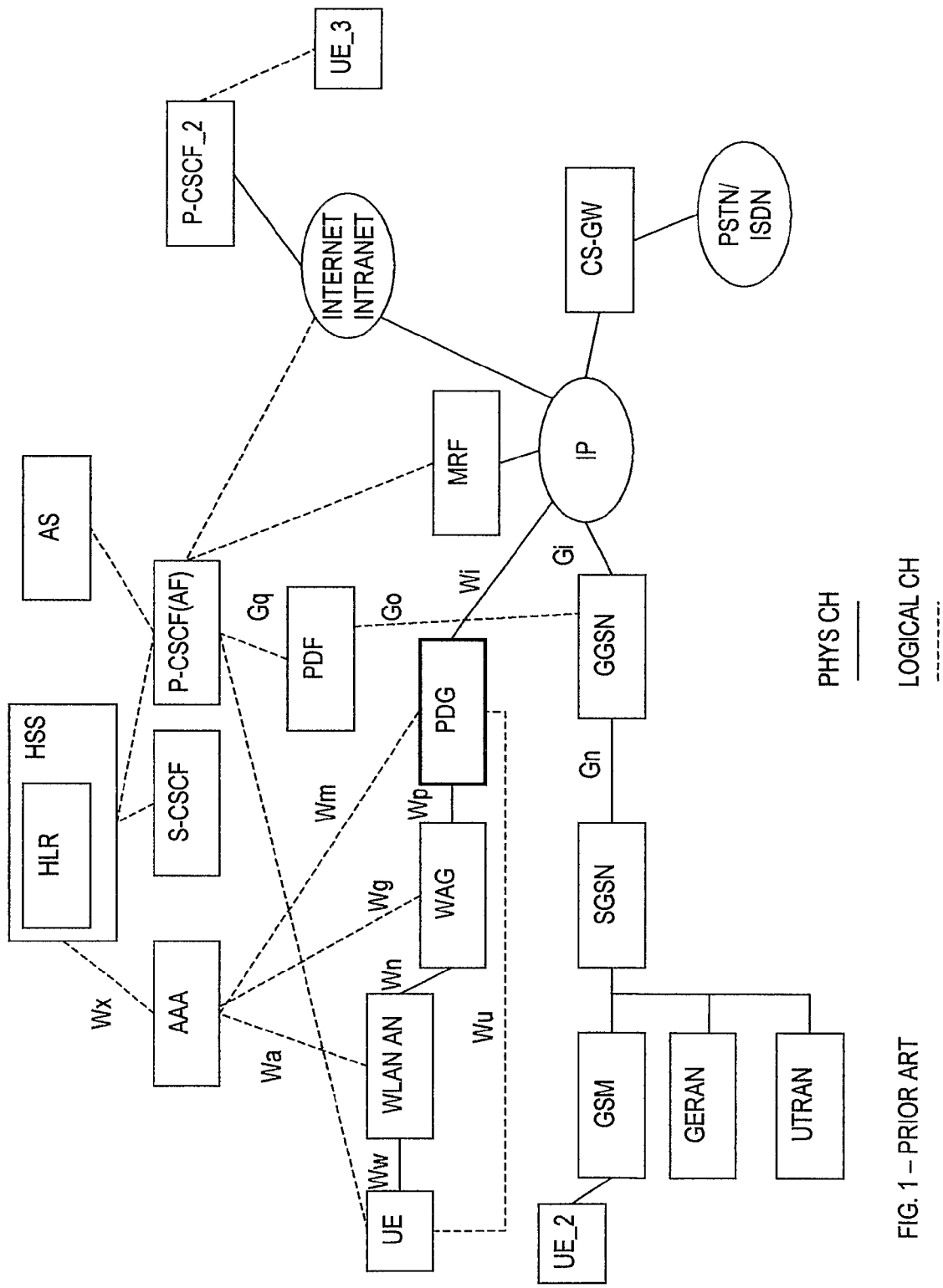
FIG. 1 – PRIOR ART

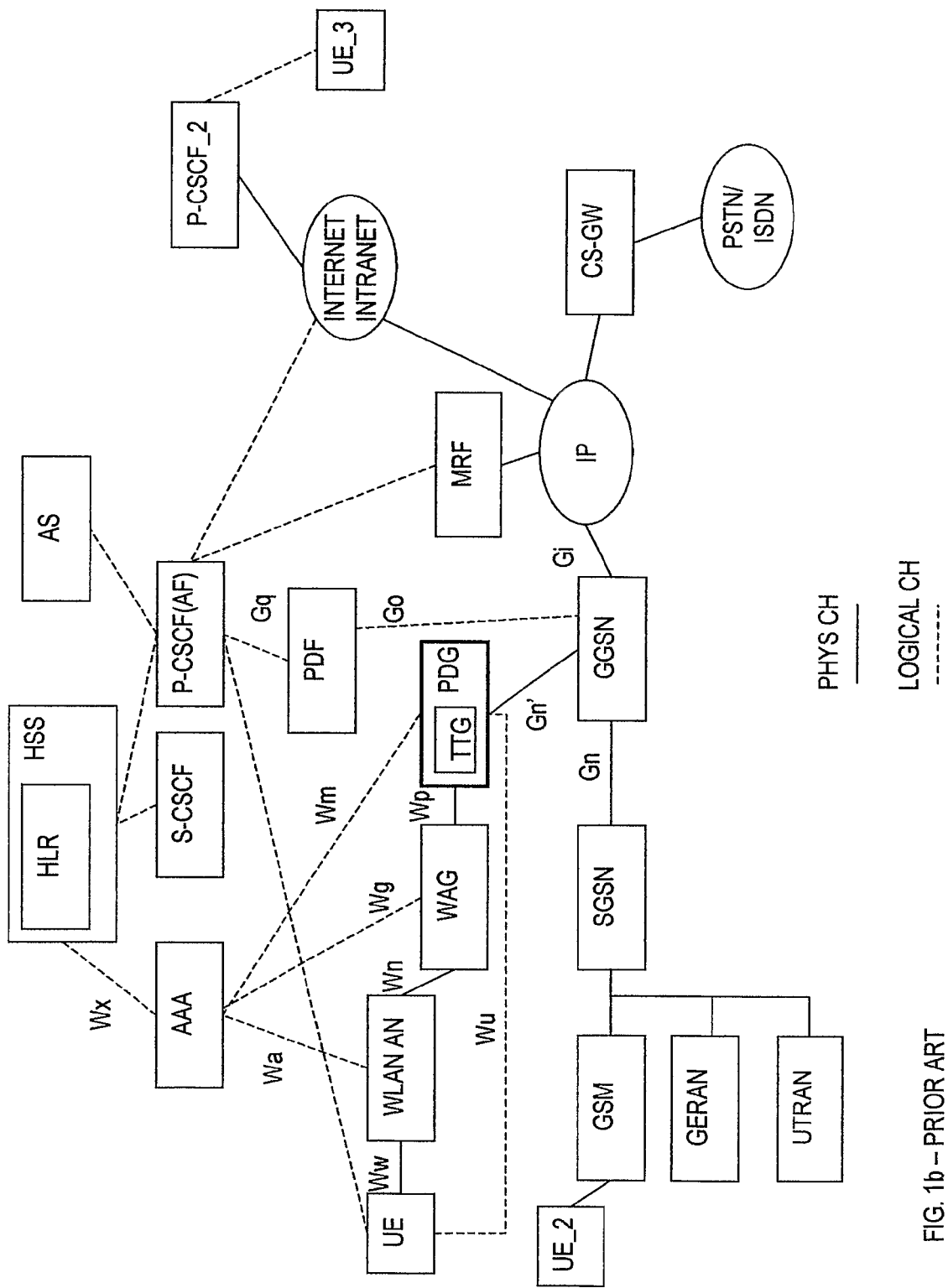
FIG. 1b – PRIOR ART

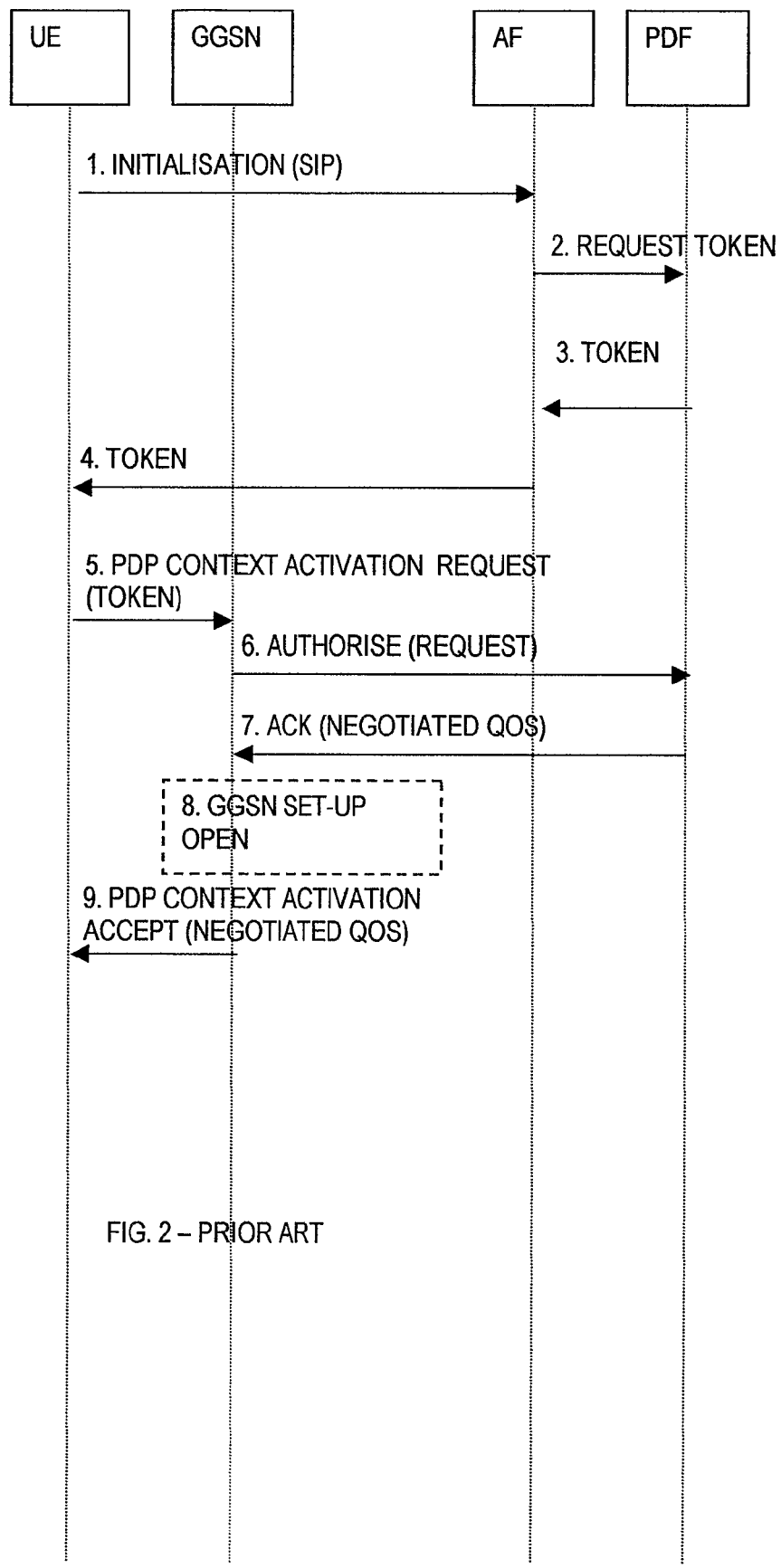
FIG. 2 – PRIOR ART

——— TRAFFIC

------- CONTROL

METHOD AND SYSTEM FOR IMPLEMENTATION OF SBLP FOR A WLAN-GSM/3G INTEGRATED SYSTEM

FIELD OF THE INVENTION

The present invention concerns the area of policy control in a 3GPP-WLAN integrated network. More specifically, the present application relates to the scenario 3 in the 3GPP work scope and the use of policy control for the future IEEE802.11e WLAN's interworking with 3GPP networks.

BACKGROUND OF THE INVENTION

Service Based Local Policy

IMS, (IP Multimedia Subsystem), is a 3G subsystem specification that enables enriched Internet Protocol based services over access technologies such as, WCDMA, CDMA2000 and GERAN. Exemplary IMS services are: Voice over IP telephony, multi-party conference calls, also denoted push-to-talk, video conferencing, file downloading, music on demand etc. Numerous other services are foreseen to be enabled by the IMS. The IMS is specified in 3GPP standards, e.g. in 3GPP TS 23.228 (IMS), TS 23.002 (Network architecture) and TS 23.207 (end-to-end QoS). These services are believed to offer enhanced value to users and consequently offer operators the possibility of in-creased revenues.

The above services would be associated with various quality of service (QoS) classes.

In order to ensure that services can be offered to users and to apply a policy such that users "get what they have paid for", but not more than that, QoS management functions are set out in the IMS system. The Policy Decision Function (PDF) and Application Function (AF) defined in TS 23.207 are IMS network elements, which secures these functions.

The PDF functions as a Policy Decision Point for the Service Base Local Policy (SBLP) and makes policy decisions based on policy set up information received from the AF and provides final policy decisions controlling the allocated QoS resources for the authorised media streams by transferring the decision to the GGSN.

The application function (AF) secures that suitable IP bearer resources can be assigned to the user equipment (UE) corresponding to the given communication (application type) the user attempts to establish (TS 23.207, c.f. section 5.2.4). The AF indicates to the PDF whether or not the PDF should contact the AF at UE resource reservation and indicates to the PDF whether media should be enabled or disabled.

The signaling procedure for SBLP involved in the authorization method according to 3GPP has been shown in FIG. 2 (corresponds to TS 23.228(IMS) and TS 29.208(SBLP)):

1) For a mobile originated (MO) call, the UE sends a SIP Initialisation message to the AF (P-CSCF) indicating a session. For a mobile terminated (MT) call, the AF (P-SCCF) receives a SIP message from another mobile or fixed terminal.
2) The AF requests the PDF for a token associated with this session request (SIP initialisation message) and makes an indication for a corresponding QoS.
3) The PDF examines the request and if it can be accepted assigns a suitable QoS, which may normally not deviate from the QoS indicated in step 2) and generates a token (containing a PDF identifier (note: the network may include multiple PDF's); a session identifier and the assigned QoS for the session) and sends it to the AF over the Gq interface. The token and associated assigned QoS is stored in the PDF to be used in step 6).
4) The AF sends the token to the UE, using SIP signaling. The signaling includes the assigned QoS to be used for the session.
5) The UE performs a PDP context Activation Request/(Token) involving activating a secondary PDP Context for this new service according to a requested QoS and sends the token, previously received, as part of the Activation request (PS: the token including the "required" QoS may potentially be hampered by a rogue UE, indicating a higher required QoS than assigned).
6) The GGSN sends an Authorise (Request) message including the token received in the secondary PDP context Activation to the PDF, indicated by the token, on the Go interface.
7) The PDF evaluates that the token received from the UE corresponds to the token the AF previously issued, i.e. that the requested QoS does not exceed the assigned QoS for the service. The PDF sends a grant (Acknowledge including a negotiated QoS) (or deny) back to the GGSN and includes the filters to apply to the PDP Context in order for GGSN to do policing. If the requested QoS is higher than the assigned QoS, the PDF may downgrade the QoS to a "negotiated" lower QoS.
8) Set-up is carried out in the GGSN such that only packets belonging to the correct session are passed through the PDP Context. Other packets are stopped, dropped or handled in some other way, but not delivered to the destination. (Thereby, the User Equipment will not be served with a higher service class than paid for).
9) The GGSN sends back the PDP Context Activation Accept to the UE and the UE can start sending data in (the tunnel established according to) the new secondary PDP Context.

Alternative Known Architecture

In FIG. 1$b$, an alternative known architecture has been shown relating TS23.254-6 Annex F.

According to FIG. 1$b$, an interface Gn' is provided between the packet data gateway and the GGSN such that the packet data gateway can access the Internet through a GGSN. No Wi interface is provided between the PDG and the Internet. A component denoted Tunnel Termination Gateway (TTG) residing in the PDG achieves connectivity with the GGSN, where the GGSN can take over some of the PDG functions e.g. charging functions. Hence, the known PDG functionality is performed by the PDG and the GGSN in common.

It should be noted that, the PDG of FIG. 1$b$ is not capable of controlling QoS towards the 3G core-network for a WLAN user equipment.

WLAN/3G Integration

There is standardization work ongoing to integrate WLAN access, (Wireless-Local Access Network), such as specified according to the IEEE 802.11 series of protocols with the core network of GSM/GERAN/3G (Groupe Speciale Mobile/EDGE/3rd generation mobile telephony-UMTS). The work is ongoing in 3GPP ($3^{rd}$ Generation Partnership Project), 3GPP2 and IEEE. Six scenarios for various degree of integration have been defined in 3GPP. Scenarios 1, 2 and 3 have been discussed so far as indicated in TS 23.234.

The work for scenario 3, i.e. WLAN GSM/3G integration of data services is specified in stage 2 in TS 23.234 supporting data services (IMS, MMS, SMS) to operators mobile home network. In the TS 22.234 it is specified that IMS should be possible to provide over WLAN.

Most WLAN's deployed today are 802.11b systems. These systems do not have QoS support and therefore are not subject to the SBLP (Service Based Local Policy) explained above.

However, in IEEE there is a standardization effort going on in 802.11e topic group to specify QoS support for 802.11 systems.

The WLAN/3GPP architecture specified in TS 23.234 is shown in FIG. 1. The WLAN UE can access WLAN Access Network and do security procedures towards the 3G Home Network using the Wa interface via the 3GPP AAA Server. This is the scenario 2 according to the 3GPP scope.

For scenario 3, i.e. WLAN GSM/3G integration of data services, the WLAN UE sets up a tunnel on the Wu interface to a PDG (Packet Data Gateway), in order to access 3G data services and other data services via the Wi interface. This tunnel is assumed to be an IP Sec tunnel, end-to-end between the UE and the PDG, and will be used for multiplexing all data traffic services.

The problem with the existing WLAN solution is that there is no mechanism for controlling QoS towards the 3G-core network.

SUMMARY OF THE INVENTION

It is a primary object of the present invention to set forth a method for an implementation of SBLP for a WLAN-GSM/3G integrated system.

It is a further object to set forth a PDG (Packet Data Gateway).

It is a further object to set forth a WLAN user entity.

Further advantages will appear from the following detailed description of the invention.

BRIEF DESCRIPTION OF THE DRAWINGS

FIG. 1 shows known a packet data gateway (PDG) as seen inserted in the known WLAN/3GPP-GSM/3G network architecture, FIG. 1b shows another known WLAN/3GPP-GSM/3G network architecture, FIG. 2 is a handshake diagram for the known SBLP procedure for GSM/3G user entities.

DETAILED DESCRIPTION OF PREFERRED EMBODIMENTS OF THE INVENTION

SBLP in PDG

Figure 3:
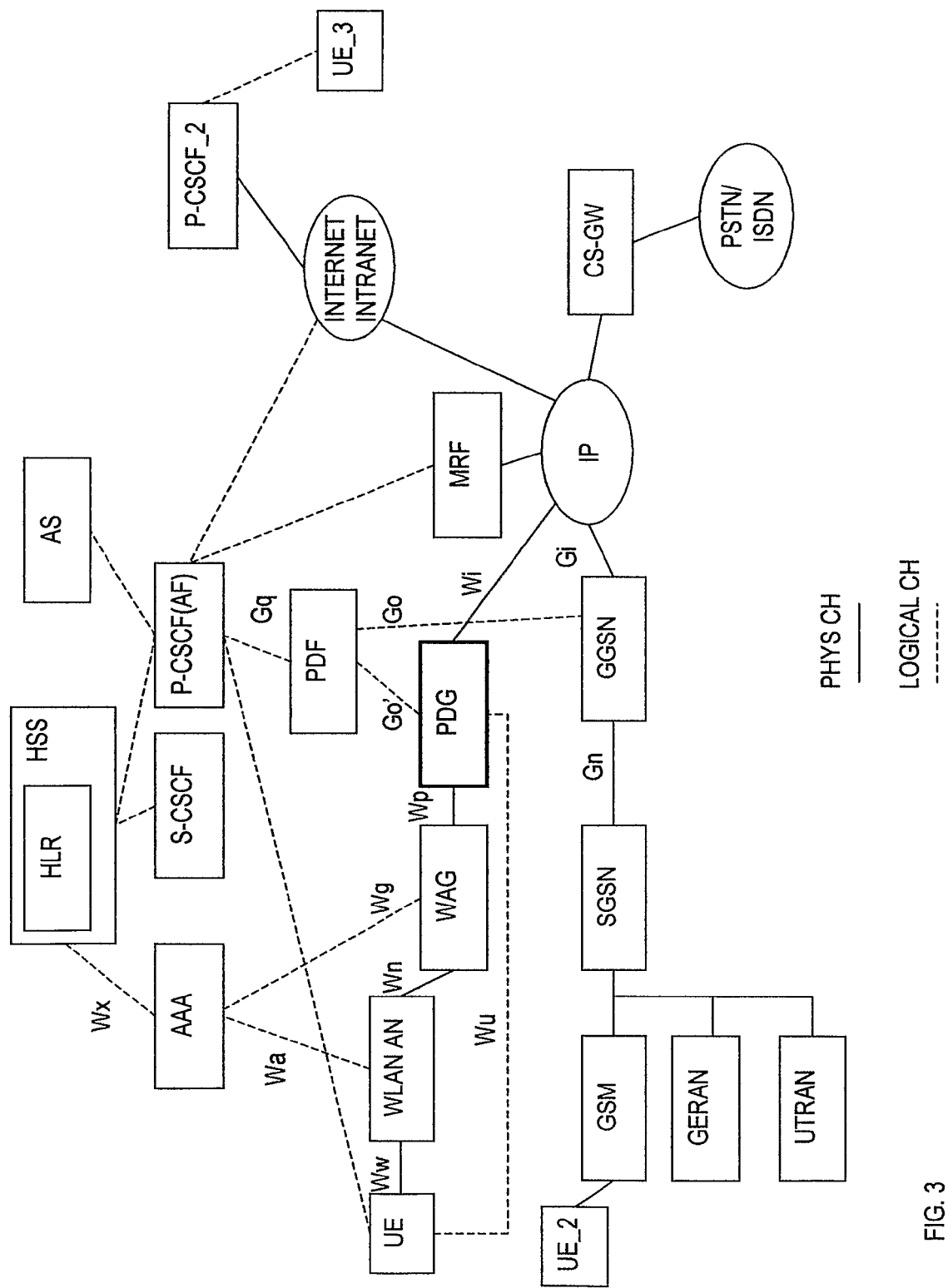
FIG. 3 shows a packet data gateway (PDG) according to the invention as seen inserted in the known WLAN/3GPP-GSM/3G network architecture.

A first embodiment of the invention relates to the architecture shown in FIG. 3, whereby a WLAN equipped user entity, UE, having at least a WLAN network interface card is communicating with a packet data gateway, PDG.

Figure 4:
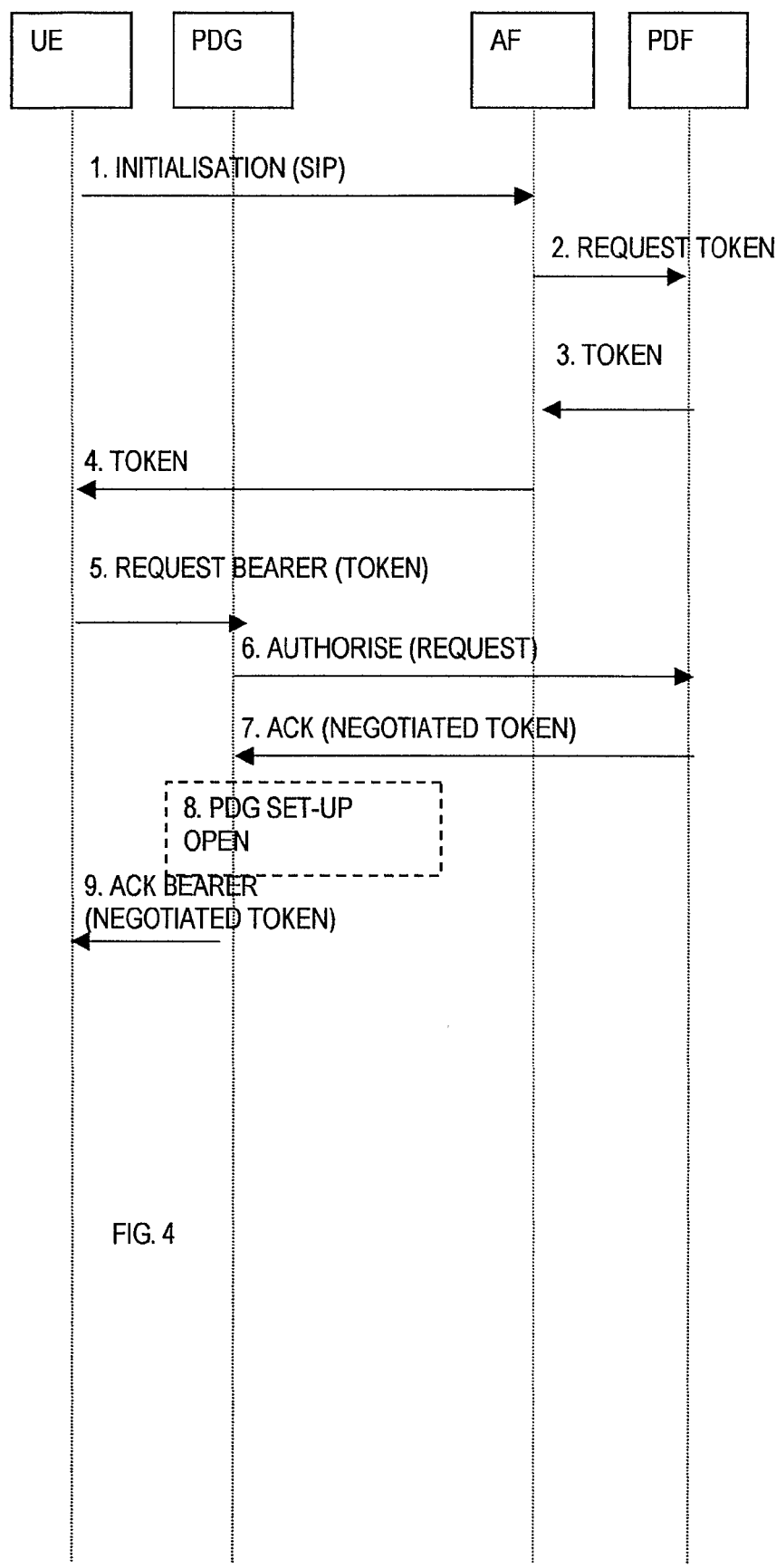
FIG. 4 is a handshake diagram according to a first embodiment of the invention for a WLAN user entity for simulating the SBLP procedure for GSM/3G user entities.
Figure 5:
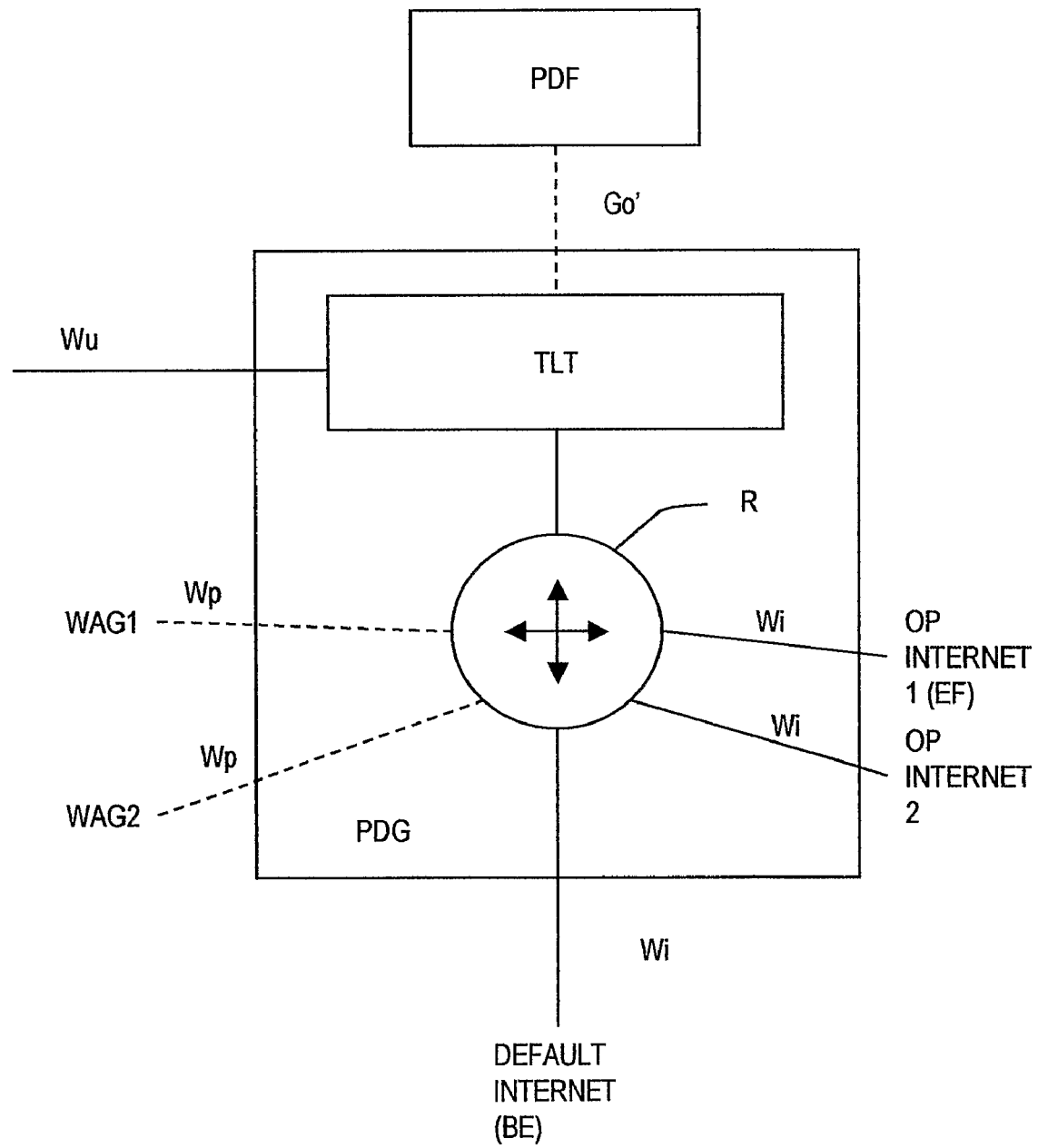
FIG. 5 shows the PDG according to first embodiment of the invention.

The PDG according to the invention, shown in FIG. 5, is carrying out a SBLP for obtaining equivalent policing function as is known from the GGSN node doing policing traffic of 3G UE's (UE_2) explained above in connection with FIG. 2. For this purpose, the PDG according to a first embodiment of the invention is provided with a new interface, Go', connecting to the known PDF. According to the invention, the PDG makes use of the same messages, 1-4, 6 and 7 as shown in FIG. 4 when carrying out a SBLP. However, according to the preferred embodiment of the invention, the signaling between the UE and the PDG, i.e. messages 5 and 9, constitute new signaling. For the PDG the signaling between the PDG and the PDF (Go'), i.e. messages 6 and 7, does also constitute new signaling.

Figure 7:
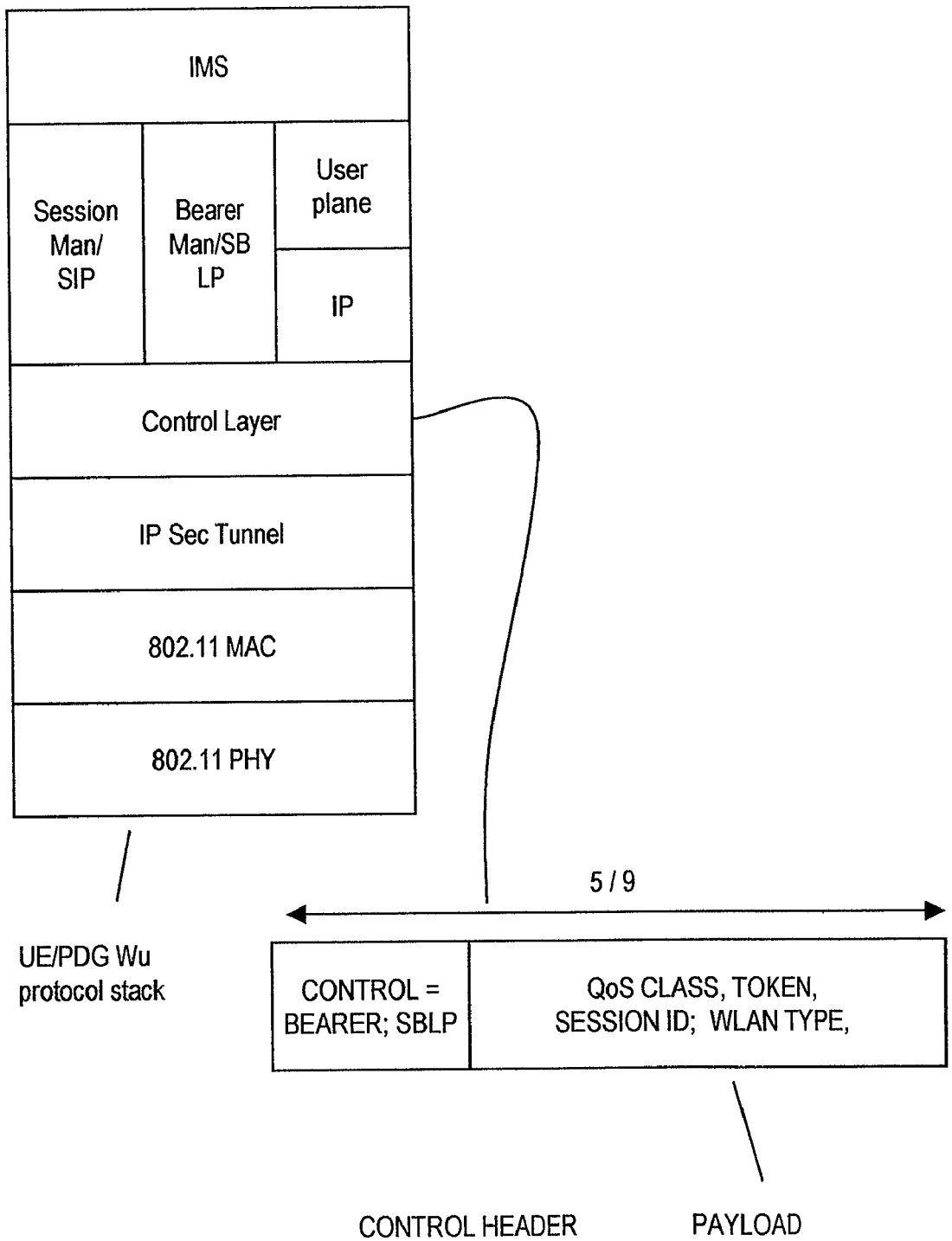
FIG. 7 shows the various protocol layers being involved for the invention and a user equipment according to the invention.

According to the invention, a new protocol on the interface between the UE and a PDG is defined. In FIG. 7, this protocol has been shown comprising the following layers as starting from layer 1: a 802.11 wireless physical layer, a 802.11 MAC layer; an IP sec tunnel layer; a control layer; a session/bearer and user plane layer, and finally an IMS (IP multimedia services) layer.

The control layer defines communication by means of a signaling format, also shown in FIG. 7, for a Request Bearer signal, step 5), and an Acknowledge Bearer signal, step 9), both signals comprising a control header and a payload. The control header comprises a flag indicating that the corresponding payload in the packet comprises SBLP information. The payload comprises QoS class, token, session ID and WLAN type.

The PDG

According to a preferred embodiment of the invention, the invention makes use of the IEEE 802.11e enabled user entities and it may preferably utilize the DiffServ QoS supported by 802.11e.

FIG. 5 shows a preferred embodiment of a PDG of the invention. The PDG comprises a translator and control unit, TLT, which controls a Router, R.

The router R provides connection to a default gateway to the Internet at a best effort (BE) level, for instance not being associated with any guaranteed QoS and only providing modest speed, a gateway via a guaranteed service class, such as Expedite Forwarding (EF), belonging for instance to a mobile services operators network, OP_INTERNET1, and a second gateway belonging to the same latter operators network (OP_INTERNET2) but not providing Expedite forwarding.

The router moreover provides connection to a plurality of WAGs (Wireless Access Gateways), WAG1 and WAG2, over interfaces Wp. The translator and control unit TLT comprises a logical interface, Go', to a policy decision function, PDF.

Preferably, the packet data gateway (PDG) makes use of the DiffServ (Differentiated Services) standard, which is a known IETF standard (RFC 2475) whose object it is to provide QoS (Quality of Service) for IP traffic. Diffserv uses the IP TOS (type of service) field to carry information about IP packet service requirements. Diffserv operates at Layer 3 in the OSI model.

The FIG. 4 signaling sequence shall now be explained in more detail with regard to the PDG:

SIP message step 1) to the AF at service initialisation indicates the demanded service class. The PDF sends back a token and a DiffServ Code Point in message step 3). A Diff-Serv Code Point identifies the requested QoS, which is forwarded by message step 4) to the UE by the AF. The token includes an identifier of the service together with the assigned QoS in the PDF.

The UE receives the token and the DiffServ code point, 4), and sends the token on to the PDG in the message 5). The token received by the PDG from the UE, step 5), identifies the service, which the bearer request is to be used for, together with an address to the PDF to be used. The PDG gets authorization according to messages 6) and 7), for a given bearer from the PDF and opens a gate for the requested DiffServ Code Point, and sends subsequently an acknowledge signal back to the UE in message 9).

The information included in the ACK Bearer signal, step 9), includes the DiffServ code point. The DiffServ Code Point identifies the negotiated QoS.

Depending on the QoS class indicated by the Diffserv field, received in step 7), the router R carries out its policing function by distributing packets between any of the above gateways or dropping packets.

This allows the PDG to filter the traffic for a given user entity, UE, so as to accept packets belonging to the service with the correct DiffServ code point QoS applied. The UE may for instance request Expedited Forwarding (EF) QoS for a streaming service. The PDG consequently opens, c.f. step 8), FIG. 4—an Expedited Forwarding (EF) gate after that the PDF has authorized the requested service as indicated by the token, provided by the SBLP procedure. The policing function of the PDG could moreover provide that packets tagged with EF would be dropped and only Best Effort (BE) traffic would be allowed by routing those packets on the default Internet connection shown in FIG. 5.

Using this method of tagging packets with DiffServ code points, it is possible to multiplex all traffic on the same end-to-end tunnel between the UE and the PDG (Wu), and still apply differentiated QoS according to DiffServ methods. There is no need for separate bearers, such as used in GPRS, where secondary PDP Contexts are used for each new service. The tag of the inner header of a tunnel shall be copied to the outer header, in order for the WLAN AN (Access Node) to perform QoS differentiation. Other ways to perform QoS differentiation could be to setup multiple IPsec tunnels between UE and PDG, each tunnel with a unique QoS (e.g. one tunnel with EF traffic and one with BE traffic). Usage of emerging QoS mechanisms in 802.11 could also be done. Existing mechanisms such as RSVP may also be possible to use.

Second Embodiment

A second embodiment of the invention utilises the architecture shown in FIG. 1b. This alternative takes advantage of the facilities for charging and policing functions connectivity already provided by the GGSN. Hence, the packet data gateway (PDG) functionality relating to policy function interaction and charging is achieved by the distributed GGSN and TTG nodes.

Figure 4B:
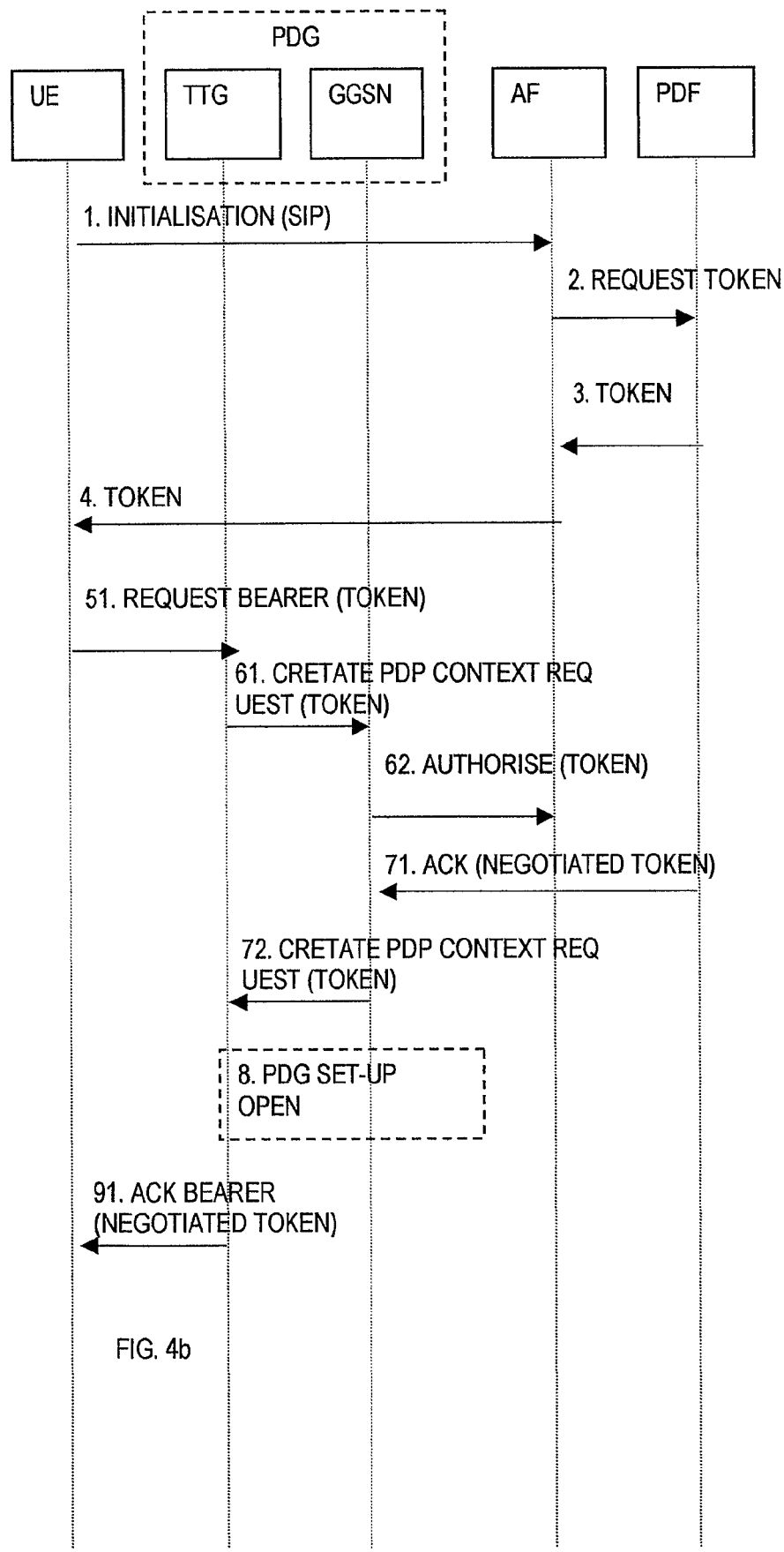
FIG. 4b is a handshake diagram according to a second embodiment of the invention for a WLAN user entity for simulating the SBLP procedure for GSM/3G user entities relating to the FIG. 1b architecture.

In FIG. 4b, the procedure for carrying out the SBLP in the FIG. 1b architecture has been shown.

Steps 1-4 are identical with the procedure shown in FIG. 4, while the Request Bearer signal 51) is handled by the TTG node.

As appears from FIG. 4b, the TTG upon receiving a Request Bearer (token) signal from the UE, signals a Create PDP Context Request signal 61) to a dedicated GGSN, where-upon the GGSN in question issues the Authorise signal 62) to the Policy Decision Function (PDF). The PDF in turn issues an Acknowledge 71) with the negotiated token and sends it to the GGSN, which in turn forwards a create PDP Context response 72) to the TTG.

Figure 6:
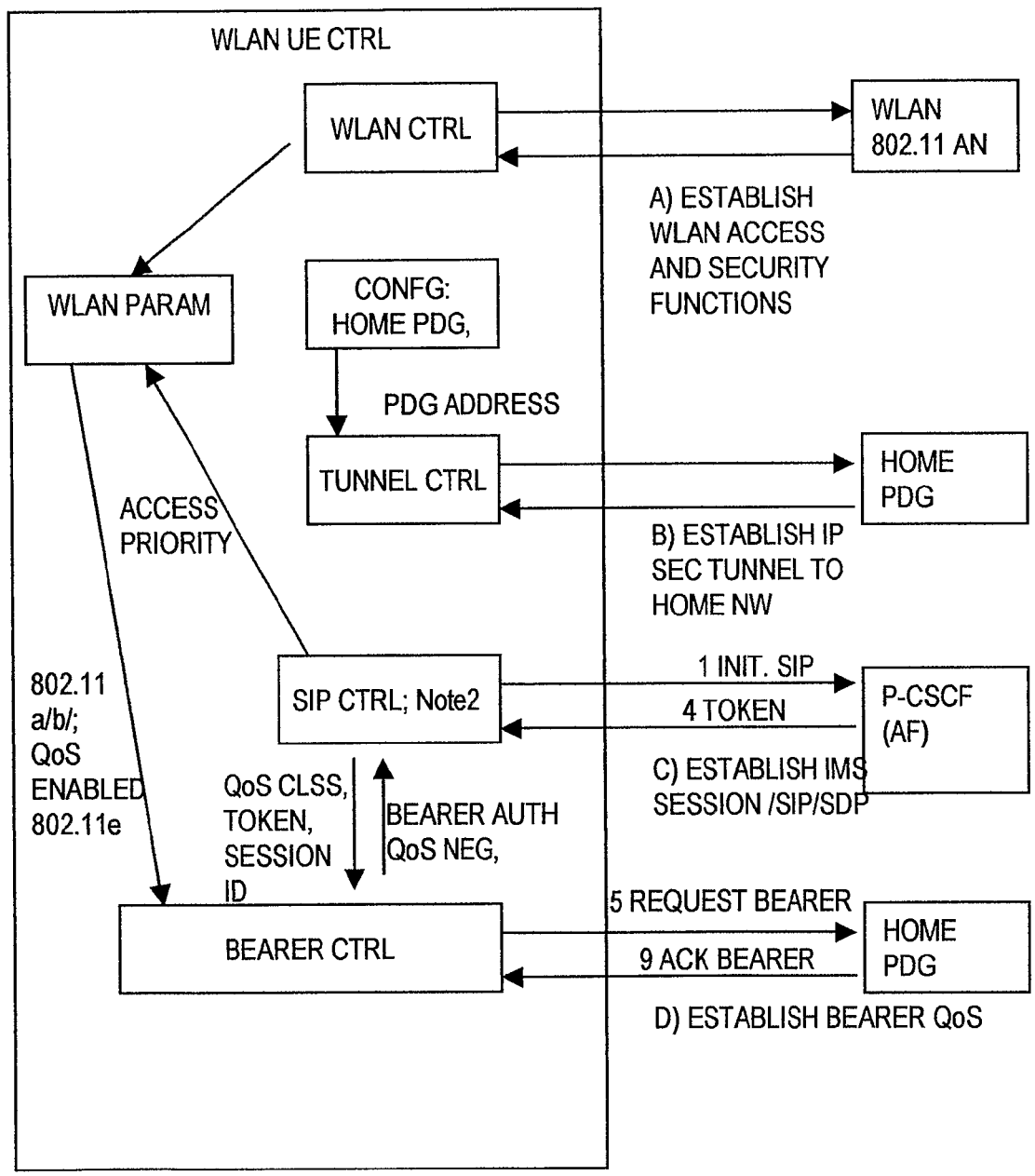
FIG. 6 is a signaling diagram concerning the WLAN user entity according to the invention.

Then follows the PDG set up, step 8), and the subsequent Acknowledge Bearer signaling 91) to the UE, corresponding to 9) in FIG. 4 The advantage with the arrangement in 4b is that the implementation of the Go interface in the GGSN is reused, and also other functions such as charging functions. The WLAN UE FIG. 6 shows the operating principle from the perspective of the WLAN enabled user entity, UE, according to the invention. The user entity comprises a WLAN control application, WLAN_CTRL, a tunnel control application for controlling IPsec tunnels toward a home PDG, TUNNEL_CTRL, SIP control, SIP_CTRL for handling the token; and a bearer control, BEARER_CTRL, application for communicating with the home packet data gateway, Home_PDG.

The procedure carried out when the user initiates the packet switched transmitting receiving data over the Internet, as supported by the IMS system shall be explained in the following.

A) The WLAN UE power's up and starts scanning for WLAN AP access.

The UE associates to a WLAN AP, and reads access parameters such as system information and access info from the Beacon.

Security procedures are performed, e.g. authentication to PLMN via an AAA server according to scenario 2 in 3 GPP specification 23.234.

B) For support of scenario 3 (support of data services (IMS, MMS, SMS) to operators mobile home network) the UE establishes an IP Sec tunnel to the Home network. The PDG In the Home NW provides different services such as QoS handling, charging, and access to internal and external network services.

C) When the user starts an IMS application e.g. VoIP in a Laptop, the SIP control signaling 1) towards the other end user is started, via a P-CSCF (AF) node in the Home NW. The SIP signaling (steps 1 and 4) includes session identifier, authorization token, SDP (Service Description Protocol) information that describes the service including required QoS parameters. Steps 2-3 of FIG. 4 are carried out. SDP information is mapped to bearer specific information in the user equipment; in this case SDP is mapped to WLAN parameters, such as 802.11a/b parameters, data rate, delay characteristics, access priority classes if 802.11e support is provided by the WLAN access network.

D) The user signals 5) to the PDG the bearer specific control to authorize bearer use for the IMS application started, and opening of the gating in the PDG. The PDG may have specific charging rules for the specific application.

Gating information, service flow filters, charging information etc. may be installed in the PDG when the PDF authorize the service flow steps 6) 7) in FIG. 4. The service flow filters may include authorized QoS. A mapping may be done in the PDG from authorised QoS SDP parameters to bearer QoS characteristics, e.g. DiffServ QoS classes, data rate, delay. If 802.11e is not supported Diffserv tags may be inserted in the PDG on up-link packets in order to get expedited service in the external network.

Acknowledge bearer to UE step 9).

The service flow is started and the user can send application payload end-to-end.

When the user hangs up, the service flow filters may be removed and gating closed in the PDG. The service flow is stopped.

Analogous handling is carried out in the home network of the partnering end user, e.g. for user entity UE3, in the PDG, or if a GPRS user, the GGSN, and in the PDF etc.

The invention claimed is:

1. Packet data gateway in an integrated Wireless Local Access Network (WLAN) - Groupe Speciale Mobile/3rd Generation (GSM/3G) core network, comprising a router having a number of gateways which are associated with various Quality of Service (QoS) traffic properties, an interface to a WLAN network and an interface to a policy decision function, and a translating unit;

the translating unit engaging in a service based local procedure in whereby a negotiated QoS property is received for a given session identifier as negotiated between a user entity, an Application Function, and a Policy Decision Function and whereby:

the translating unit controls the router to distribute incoming packets according to the negotiated QoS property for the given session identifier;

the router selectively discarding packets not being associated with a QoS class or forwarding data to a default gateway, and forwarding packets associated with a high QoS class to a given gateway providing a high QoS;

wherein said translating unit receives packets tagged with Differentiated Services (Diffserv) Code Points on a bearer from the user entity and said router distributes the tagged packets to appropriate gateways by applying differentiated QoS according to the Diffserv Code Points; and wherein said translating unit is able to receive packets tagged with Diffserv Code Points on the bearer from the user entity and said router is able to distribute the tagged packets to appropriate gateways by applying differentiated QoS according to the Diffserv Code Points because said translating unit previously interfaced with the user entity and received a token that identified a service which a bearer request is to be used for and a Diffserv Code Point that identified a QoS, and then said translating unit interfaced with the policy decision function and received authorization for a given bearer and opened one of the gateways for the Diffserv Code Point.

2. Packet data gateway according to claim 1, wherein the translating unit performs a mapping of authorized QoS parameters to bearer DiffServ QoS classes.

3. Packet data gateway according to claim 2, wherein the translating unit tagging packets with DiffSery code points and multiplexing all traffic on the same end-to-end tunnel between the user entity and the router.

4. Packet data gateway according to claim 1, having a logical interface to the policy decision function.

5. Packet data gateway according to claim 4, wherein the logical interface to the policy decision function is shared with logical interfaces from gateway General Packet Radio Service (GPRS) support nodes from the point of view of the latter nodes.

6. A packet data gateway for carrying out a service based local policy procedure in an integrated Wireless Local Access Network (WLAN) - Groupe Speciale Mobile/3rd Generation (GSM/3G) core network which includes at least an application function, a policy decision function, a number of gateways, and a WLAN equipped user entity, the packet data gateway comprising:

a translator and control unit that includes a logical interface to the policy decision function, and further includes another logical interface to the WLAN equipped user entity;

a router, coupled to the translator and control unit, having a number of connections to the number of gateways which are associated with various Quality of Service (QoS) traffic properties;

wherein one of the connections is to a default gateway to an Internet that provides a service class at a best effort level;

wherein one of the connections is to a gateway to a mobile services network at a guaranteed service class that provides expedite forwarding;

wherein one of the connections is to a gateway to the mobile services network at a guaranteed service class that does not provide expedite forwarding;

wherein one or more of the connections are to one or more wireless access gateways;

wherein said translator and control unit receives packets tagged with Differentiated Services (Diffserv) Code Points on a bearer from the WLAN equipped user entity and said router distributes the tagged packets to appropriate gateways by applying differentiated QoS according to the Diffserv Code Points; and wherein said translator and control unit is able to receive packets tagged with Diffserv Code Points on the bearer from the WLAN equipped user entity and said router is able to distribute the tagged packets to appropriate gateways by applyinq differentiated QoS according to the Diffserv Code Points because said translator and control unit previously interfaced with the WLAN equipped user entity and received a token that identified a service which a bearer request is to be used for and a Diffserv Code Point that identified a QoS, and then said translator and control unit interfaced with the policy decision function and received authorization for a given bearer and opened one of the gateways for the Diffserv Code Point.

7. The packet data gateway of claim 6, further comprising:

the translator and control unit engages in the service based local procedure whereby a negotiated QoS property is received for a given session identifier as negotiated between the WLAN equipped user entity, the application function, and the policy decision function;

the translator and control unit controls the router to distribute incoming packets according to the negotiated QoS property for the given session identifier;

the router selectively discards packets not being associated with a QoS class or forwards data to the default gateway, and forwards packets associated with a high QoS class to one of the gateways providing a high QoS.

8. The packet data gateway according to claim 7, wherein the translator and control unit maps authorized QoS parameters to bearer DiffServ QoS classes.

9. The packet data gateway according to claim 8, wherein the translator and control unit tags packets with DiffSery code points and multiplexes all traffic on the same end-to-end tunnel between the WLAN equipped user entity and the router.

10. The packet data gateway according to claim 6, wherein the logical interface to the policy decision function is shared with logical interfaces from gateway General Packet Radio Service (GPRS) support nodes.

* * * * *

UNITED STATES PATENT AND TRADEMARK OFFICE
CERTIFICATE OF CORRECTION

PATENT NO. : 7,916,732 B2
APPLICATION NO. : 11/720496
DATED : March 29, 2011
INVENTOR(S) : Rydnell et al.

It is certified that error appears in the above-identified patent and that said Letters Patent is hereby corrected as shown below:

On the Title Page, in Item (75), under "Inventors", in Column 1, Line 1, delete "Frolunda" and insert -- Frölunda --, therefor.

On the Title Page, in the Figure, for Point "61", Line 1, delete "CRETATE" and insert -- CREATE --, therefor.

On the Title Page, in the Figure, for Point "72", Line 1, delete "CRETATE" and insert -- CREATE --, therefor.

On Title Page 2, in Item (56), under "OTHER PUBLICATIONS", in Column 2, Line 3, delete "Atra" and insert -- Area --, therefor.

In the Drawings, Fig. 4b, for Point "61", Line 1, delete "CRETATE" and insert -- CREATE --, therefor.

In the Drawings, Fig. 4b, for Point "72", Line 1, delete "CRETATE" and insert -- CREATE --, therefor.

In the Drawings, Fig. 6, delete "  " and insert -- -- , therefor.

In the Drawings, Fig. 7, delete "WLAN TYPE," and insert -- WLAN TYPE --, therefor.

In Column 1, Line 27, delete "in-creased" and insert -- increased --, therefor.

In Column 5, Line 64, delete "FIG. 4" and insert -- FIG. 4. --, therefor.

Signed and Sealed this
Twenty-sixth Day of June, 2012

David J. Kappos
*Director of the United States Patent and Trademark Office*

CERTIFICATE OF CORRECTION (continued)
U.S. Pat. No. 7,916,732 B2

In Column 6, Line 10, delete "transmitting receiving" and insert -- transmitting/receiving --, therefor.

In Column 7, Line 39, in Claim 3, delete "DiffSery" and insert -- DiffServ --, therefor.

In Column 8, Line 24, in Claim 6, delete "applyinq" and insert -- applying --, therefor.

In Column 8, Line 51, in Claim 9, delete "DiffSery" and insert -- DiffServ --, therefor.